(12) United States Patent
Yang et al.

(10) Patent No.: US 10,643,619 B2
(45) Date of Patent: May 5, 2020

(54) DYNAMIC DISPATCHER ELECTRONIC DIGITAL ASSISTANT MONITORING IN A MOBILE RADIO SYSTEM

(71) Applicant: MOTOROLA SOLUTIONS, INC, Chicago, IL (US)

(72) Inventors: Yunhai Yang, Elgin, IL (US); Daniel J. McDonald, Cary, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 51 days.

(21) Appl. No.: 16/104,963

(22) Filed: Aug. 20, 2018

(65) Prior Publication Data
US 2020/0058305 A1 Feb. 20, 2020

(51) Int. Cl.
| | |
|---|---|
| *H04W 4/10* | (2009.01) |
| *G10L 15/26* | (2006.01) |
| *G06F 16/9032* | (2019.01) |
| *G10L 13/04* | (2013.01) |
| *H04M 3/51* | (2006.01) |

(52) U.S. Cl.
CPC ...... *G10L 15/265* (2013.01); *G06F 16/90332* (2019.01); *G10L 13/043* (2013.01); *H04M 3/5191* (2013.01); *H04W 4/10* (2013.01)

(58) Field of Classification Search
CPC ......... H04W 4/10; H04W 4/08; H04W 76/45; H04W 84/08; H04W 4/06; H04L 65/406
USPC .................................................. 455/518–520
See application file for complete search history.

(56) References Cited

U.S. PATENT DOCUMENTS

| | | | |
|---|---|---|---|
| 5,933,780 A | 8/1999 | Connor et al. | |
| 7,986,692 B2 | 7/2011 | McDonald et al. | |
| 8,781,515 B2 | 7/2014 | Agulnik et al. | |
| 9,584,987 B1 | 2/2017 | Bar-On et al. | |
| 9,961,516 B1* | 5/2018 | Proctor | H04W 4/10 |
| 2010/0227583 A1 | 9/2010 | Roy et al. | |
| 2014/0243034 A1 | 8/2014 | Gurney et al. | |

FOREIGN PATENT DOCUMENTS

WO 2018125571 A1 7/2018

OTHER PUBLICATIONS

The International Search Report and the Written Opinion corresponding patent application No. PCT/US2019/046288 filed Aug. 13, 2019, dated Nov. 7, 2019, all pages.

* cited by examiner

*Primary Examiner* — Philip Sobutka
(74) *Attorney, Agent, or Firm* — Daniel R. Bestor

(57) ABSTRACT

A process for dispatcher monitoring of an electronic digital assistant (EDA) in a group-based mobile radio system includes first receiving, at a radio controller from a mobile radio, a request to establish an EDA call for interacting with an EDA. Identifying one of (i) a primary talkgroup to which the mobile radio is affiliated and (ii) an agency to which the mobile radio belongs. Selecting or creating an EDA talkgroup, different from the primary talkgroup, through which the mobile radio may interact with the EDA. Identifying one or more, but less than all, dispatch consoles that are (i) subscribed to monitor the primary talkgroup of the mobile radio or (ii) a member of a same agency as the mobile radio. Adding the EDA, mobile radio, and identified dispatch consoles to the EDA talkgroup. And causing the EDA call to be established.

20 Claims, 5 Drawing Sheets

US 10,643,619 B2

DYNAMIC DISPATCHER ELECTRONIC DIGITAL ASSISTANT MONITORING IN A MOBILE RADIO SYSTEM

BACKGROUND OF THE INVENTION

Tablets, laptops, phones (e.g., cellular or satellite), mobile (vehicular) or portable (personal) two-way radios, and other mobile computing devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such mobile computing devices further comprise, or provide access to, electronic digital assistants (or sometimes referenced as "virtual partners") that can provide the user thereof with valuable information in an automated (e.g., without further user input) or semi-automated (e.g., with some further user input) fashion. The valuable information provided to the user can be based on explicit requests for such information posed by the user via an input (e.g., such as a parsed natural language input or an electronic touch interface manipulation associated with an explicit request) in which the electronic digital assistant may reactively provide such requested valuable information, or can be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

While existing electronic digital assistants may be capable of providing individualized and automated answers to user-posed questions and/or providing proactive notices or other types of information, particular communications markets such as public safety first responders typically use communications devices such as two-way radios and/or broadband push-to-talk services that implement group-based communications models. Such same or different communications markets may also provide control or dispatch stations that are used to monitor one or more group communications in such group-based communications models. However, existing electronic digital assistants do not integrate with these environments and fail to leverage the group-based communications models and control or dispatch stations in a technically useful and user-intuitive manner.

Thus, there exists a need for an improved technical method, device, and system for a group-based communications model including a controller for communicatively coupling between end user communication device(s) initiating an electronic digital assistant session and one or more dispatch consoles associated with the end user communication device(s) so that commanders, dispatchers, or other command or monitoring-type users may be automatically joined to monitor electronic digital assistant sessions of users that they are associated with, among other technical benefits and advantages.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
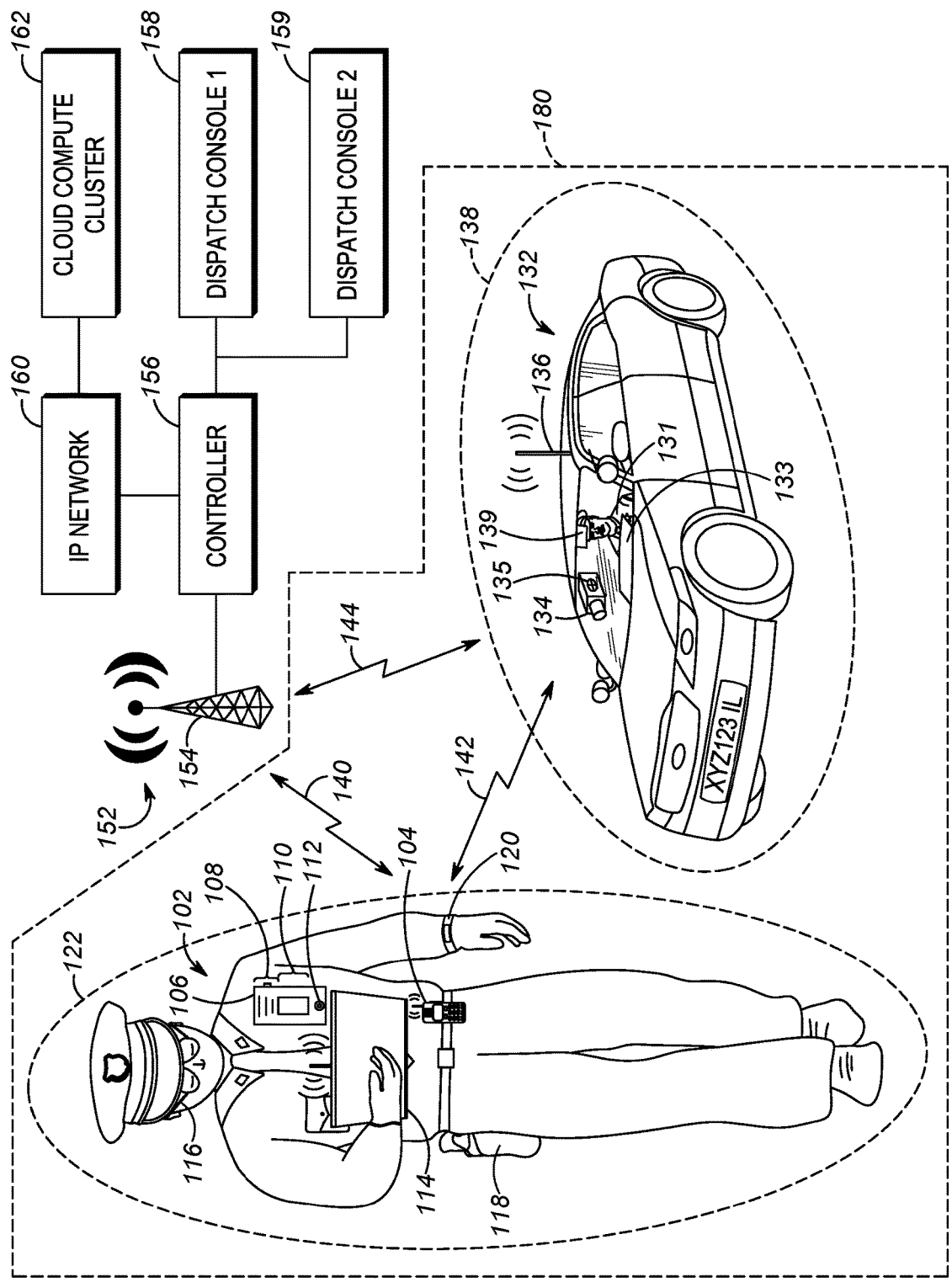
FIG. 1 is a system diagram illustrating a system for operating an electronic digital assistant and controller for communicatively coupling between end user communication device(s) initiating an electronic digital assistant session and one or more dispatch consoles associated with the end user communication device(s), in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved technical method, device, and system for a group-based communications model including a controller for communicatively coupling between end user communication device(s) initiating an electronic digital assistant session and one or more dispatch consoles associated with the end user communication device(s) so that commanders, dispatchers, or other command or monitoring-type users may be automatically joined to monitor electronic digital assistant sessions of users that they are associated with, among other technical benefits and advantages.

In one embodiment, a process for dynamic dispatcher electronic digital assistant monitoring in a group-based mobile radio system includes: receiving, at a radio controller electronic processing device from a mobile radio, a request to establish an electronic digital assistant call for interacting with an electronic digital assistant; identifying, by the radio controller, one of (i) a primary talkgroup to which the mobile radio is affiliated and (ii) an agency to which the mobile radio belongs; selecting or creating, by the radio controller, a particular electronic digital assistant talkgroup having a unique talkgroup identifier, different from the primary talkgroup, through which the mobile radio may interact with the electronic digital assistant; identifying, by the radio controller, one or more, but less than all dispatch consoles, particular dispatch consoles that are one of (i) subscribed to monitor the primary talkgroup of the mobile radio and (ii) a member of a same agency as the mobile radio; and adding, by the radio controller: the electronic digital assistant to the particular electronic digital assistant talkgroup; the mobile radio to the particular electronic digital assistant talkgroup; and the one or more particular dispatch consoles to the particular electronic digital assistant talkgroup to allow one or more dispatchers operating the respective one or more particular dispatch consoles to monitor the mobile radio's interactions with the electronic digital assistant; and causing the electronic digital assistant call to be established.

In a further embodiment, a radio controller electronic processing device for electronic digital assistant monitoring in a group-based mobile radio system includes: a memory; a transceiver; and one or more processors configured to: receive, via the transceiver from a mobile radio, a request to establish an electronic digital assistant call for interacting with an electronic digital assistant; identify one of (i) a primary talkgroup to which the mobile radio is affiliated and (ii) an agency to which the mobile radio belongs; select or create a particular electronic digital assistant talkgroup having a unique talkgroup identifier, different from the primary talkgroup, through which the mobile radio may interact with the electronic digital assistant; identify one or more, but less than all dispatch consoles, particular dispatch consoles that are one of (i) subscribed to monitor the primary talkgroup of the mobile radio and (ii) a member of a same agency as the mobile radio; and add: the electronic digital assistant to the particular electronic digital assistant talkgroup; the mobile radio to the particular electronic digital assistant talkgroup; and the one or more particular dispatch consoles to the particular electronic digital assistant talkgroup to allow one or more dispatchers operating the respective one or more particular dispatch consoles to monitor the mobile radio's interactions with the electronic digital assistant; and cause the electronic digital assistant call to be established.

In a still further embodiment, a non-transient computer readable medium containing program instructions for causing an electronic computing device to perform a set of functions including: receive, at the electronic computing device from a mobile radio, a request to establish an electronic digital assistant call for interacting with an electronic digital assistant; identify, by the electronic computing device, one of (i) a primary talkgroup to which the mobile radio is affiliated and (ii) an agency to which the mobile radio belongs; select or create, by the electronic computing device, a particular electronic digital assistant talkgroup having a unique talkgroup identifier, different from the primary talkgroup, through which the mobile radio may interact with the electronic digital assistant; identify, by the electronic computing device, one or more, but less than all dispatch consoles, particular dispatch consoles that are one of (i) subscribed to monitor the primary talkgroup of the mobile radio and (ii) a member of a same agency as the mobile radio; and add, by the electronic computing device: the electronic digital assistant to the particular electronic digital assistant talkgroup; the mobile radio to the particular electronic digital assistant talkgroup; and the one or more particular dispatch consoles to the particular electronic digital assistant talkgroup to allow one or more dispatchers operating the respective one or more particular dispatch consoles to monitor the mobile radio's interactions with the electronic digital assistant; and cause the electronic digital assistant call to be established.

Each of the above-mentioned embodiments will be discussed in more detail below, starting with example communication system and device architectures of the system in which the embodiments may be practiced, followed by an illustration of processing steps for achieving the improved technical method, device, and system as set forth herein. Further advantages and features consistent with this disclosure will be set forth in the following detailed description, with reference to the figures.

1. COMMUNICATION SYSTEM AND DEVICE STRUCTURES a. Communication System Structure Referring now to the drawings, and in particular FIG. 1, a communication system diagram illustrates a system 100 of devices including a first set of devices that a user 102 (illustrated in FIG. 1 as a first responder police officer) may wear, such as a primary battery-powered portable radio 104 used for narrowband and/or broadband (BB) direct-mode or infrastructure communications, a battery-powered radio speaker microphone (RSM) video capture device 106, a laptop 114 having an integrated video camera and used for data applications such as incident support applications, smart glasses 116 (e.g., which may be virtual reality, augmented reality, or mixed reality glasses, may include a video camera, and/or may include a head-tracking and/or eye-tracking function), sensor-enabled holster 118, and/or biometric sensor wristband 120. Although FIG. 1 illustrates only a single user 102 with a respective first set of devices, in other embodiments, the single user 102 may include additional sets of same or similar devices, and additional users (such as user 131) may be present with respective additional sets of same or similar devices as user 102. User 131 may be geographically proximate to (or not geographically proximate to) user 102. Audio of users 102 and/or 131 may be captured by devices owned, worn, or associated with user 102 or user 131 as a function of proximity and device ownership.

System 100 may also include a vehicle 132 associated with the user 102 or associated with the user 131, having an integrated vehicular mobile computing device 133, an associated vehicular video camera 134 and/or microphone 135, a coupled vehicular transceiver 136, and a head and/or eye-tracking device 139. Although FIG. 1 illustrates only a single vehicle 132 with a respective single vehicular mobile computing device 133, single vehicular video camera 134 and single transceiver 136, in other embodiments, the vehicle 132 may include additional same or similar computing devices, video cameras and/or transceivers, and additional vehicles may be present with respective additional sets of computing devices, video cameras, and/or transceivers.

Each of the portable radio 104, RSM video capture device 106, laptop 114, and vehicular mobile computing device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits.

Figure 2:
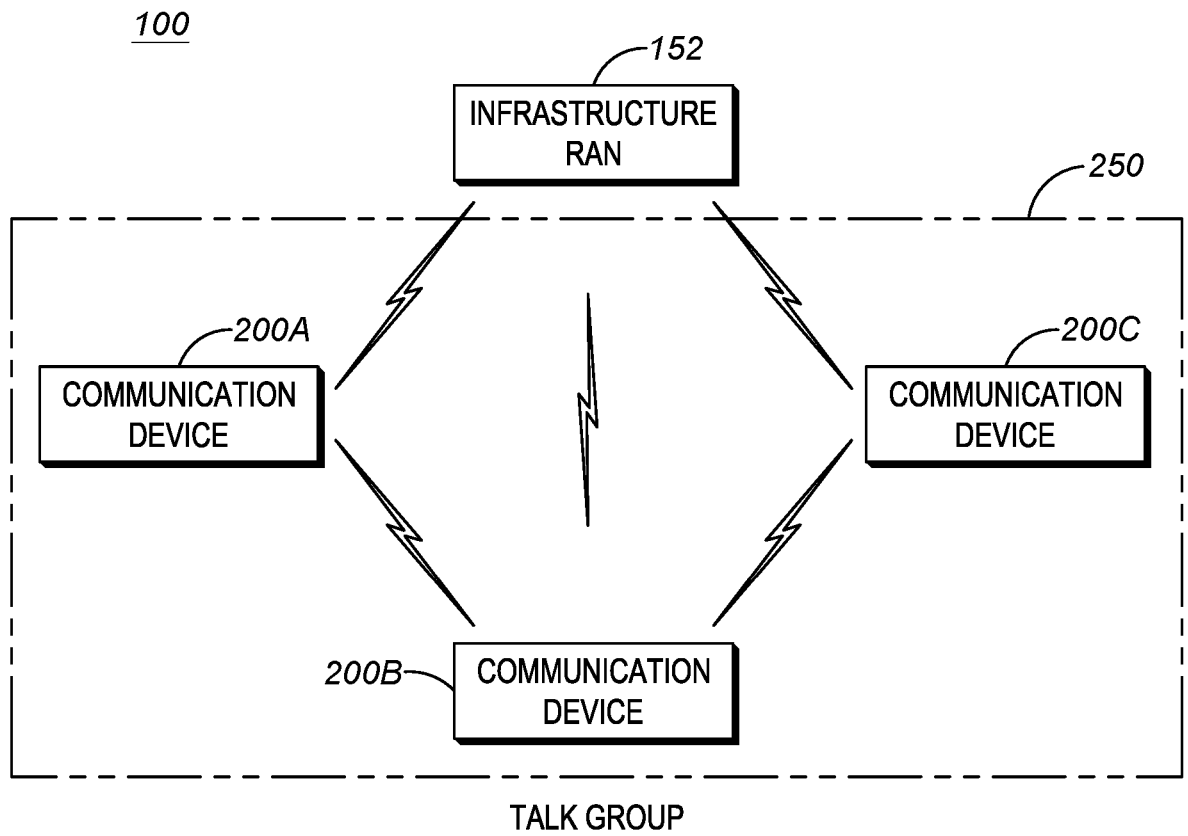
FIG. 2 is a system diagram illustrating a plurality of end user communication devices of FIG. 1 that are associated with a talk group and that may be located at varying locations, in accordance with some embodiments.

Many of the devices shown in FIG. 1 (such as the portable radio 104, the RSM video capture device 106, the laptop 114, the mobile computing device 133, the infrastructure controller 156, first dispatch console 158, second dispatch console 159, and one or more computing devices in the cloud computing cluster 162) may be referred to as communication devices (for example, communication devices 200A, 200B, 200C shown in FIG. 2). Although FIG. 1 shows multiple communication devices associated with the user 102 and/or the user 131, in some embodiments, the communication system 100 includes communication devices of multiple additional other users that may form one or more separate or overlapping groups or talkgroups.

For example, as shown in FIG. 2, multiple communication devices 200A-200C may form a talk group 250 (hereinafter referred to as "talkgroup" or "TG" as well) and may be dispersed across a wide geographic area. The communication device 200A may be associated with a first user such as user 102 of FIG. 1 located at a first location, the communication device 200B may be associated with a second user such as user 131 of FIG. 1 located at a second location, and the communication device 200C may be associated with a third user located at a third location (not shown in FIG. 1). The first, second, and third locations may be geographically the same or different from one another.

Further, as shown in FIG. 2, the communication devices 200A, 200B, and 200C are members of the same talk group, i.e., talk group 250. Although not shown in FIG. 2, each of the communication devices 200A, 200B, 200C may also be associated with one or more talk groups other than the talk group 250.

Referring back briefly to FIG. 1, user 102 and all of his or her associated communication devices may be a member of (e.g., is affiliated to) a first primary talkgroup TG_A 122 of which user 131 (and his or her communication devices) is not a member, user 131 and all of his or her associated communication devices may be a member of (e.g., is affiliated to) a second primary talkgroup TG_B 138 of which user 102 (and his or her communication devices) is not a member, and users 102 and 131 may both be subscribed to (e.g., associated with or subscribed to but not affiliated to) a same secondary talkgroup TG_Z 180.

In some embodiments, the communication devices 200A-200C communicate with each other over the infrastructure RAN 152 and/or communicate with each other directly as described herein. Similarly, other devices, such as the first dispatch console 158 and/or second dispatch console 159, may communicate with communication devices 200A-200C of multiple users through the infrastructure RAN 152 directly and/or via any one or more of the talkgroups set forth above (i.e., TG_A, TG_B, and/or TG_Z).

Returning to FIG. 1, the portable radio 104, in particular, may be any mobile computing device used for infrastructure RAN or direct-mode media (e.g., voice, audio, video, etc.) communication via a long-range wireless transmitter and/or transceiver that has a transmitter transmit range on the order of miles, e.g., 0.5-50 miles, or 3-20 miles (e.g., in comparison to a short-range transmitter such as a Bluetooth, Zigbee, or NFC transmitter) with other mobile computing devices and/or the infrastructure RAN 152. The long-range transmitter may implement a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long range transmitter may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

In the example of FIG. 1, the portable radio 104 may form the hub of communication connectivity for the user 102, through which other accessory devices such as a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 may communicatively couple.

In order to communicate with and exchange video, audio, and other media and communications with the RSM video capture device 106, laptop 114, and/or smart glasses 116, the portable radio 104 may contain one or more physical electronic ports (such as a USB port, an Ethernet port, an audio jack, etc.) for direct electronic coupling with the RSM video capture device 106, laptop 114, and/or smart glasses 116 and/or may contain a short-range transmitter (e.g., in comparison to the long-range transmitter such as a LMR or BB transmitter) and/or transceiver for wirelessly coupling with the RSM video capture device 106, laptop 114, and/or smart glasses 116. The short-range transmitter may be a Bluetooth, Zigbee, or NFC transmitter having a transmit range on the order of 0.01-100 meters, or 0.1-10 meters.

In other embodiments, the RSM video capture device 106, the laptop 114, and/or the smart glasses 116 may contain their own long-range transceivers and may communicate with one another and/or with the infrastructure RAN 152 or vehicular transceiver 136 directly without passing through portable radio 104.

The RSM video capture device 106, in particular, provides voice functionality features similar to a traditional RSM, including one or more of acting as a remote microphone that is closer to the user's 102 mouth, providing a remote speaker allowing playback of audio closer to the user's 102 ear, and including a PTT switch or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other mobile computing devices or to the infrastructure RAN 152. The voice and/or audio played back at the remote speaker may be received from the portable radio 104 or received directly from one or more other mobile computing devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and which switches the device(s) to a transmit-only mode (for half-duplex devices) or transmit and receive mode (for full-duplex devices) upon depression or activation of the PTT switch 108. As set forth earlier, the portable radio 104 and/or RSM video capture device 106 may form part of a group communications architecture that allows a single mobile computing device to communicate with one or more group members (not shown) associated with a particular group of devices at a same time.

Additional features may be provided at the RSM video capture device 106 as well. For example, a display screen 110 may be provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may be further provided at the RSM video capture device 106, integrating an ability to capture images and/or video and store the captured image data (for further analysis) or transmit the captured image data as an image or video stream to the portable radio 104 and/or to other mobile computing devices or to the infrastructure RAN 152 directly. The video camera 112 and RSM remote microphone may be used, for example, for capturing audio and/or video of a field-of-view associated with the user 102, storing the captured audio and/or video data for further analysis or transmitting the captured audio and/or video data as an audio and/or video stream to the portable radio 104 and/or to other mobile computing devices or to the infrastructure RAN 152 directly for further analysis. The RSM remote microphone may be an omni-directional or unidirectional microphone or array of omni-directional or unidirectional microphones that may be capable of identifying a direction from which a captured sound emanated.

In some embodiments, the RSM video capture device 106 may be replaced with a more limited body worn camera that may include the video camera 112 and/or microphone noted above for capturing audio and/or video, but may forego one or more of the features noted above that transform the body worn camera into a more full featured RSM, such as the separate physical PTT switch 108 and the display screen 110, and remote microphone functionality for voice communications in cooperation with portable radio 104.

The laptop 114, in particular, may be any wireless computing device used for infrastructure RAN or direct-mode media communication via a long-range or short-range wireless transmitter with other mobile computing devices and/or the infrastructure RAN 152. The laptop 114 includes a display screen for displaying a user interface to an operating system and one or more applications running on the operating system, such as a BB PTT communications application, a web browser application, a vehicle history database application, a workflow application, a forms or reporting tool application, an arrest record database application, an outstanding warrant database application, a mapping and/or navigation application, a health information database application, or other types of applications that may require user interaction to operate. The laptop 114 display screen may be, for example, an LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may be further provided at the laptop 114, integrating an ability to capture video and/or audio of the user 102 and/or a field of view substantially matching the user's 102, and store and/or otherwise process the captured video and/or audio for further analysis or transmit the captured video and/or audio as a video and/or audio stream to the portable radio 104, other mobile computing devices, and/or the infrastructure RAN 152 for further analysis.

The smart glasses 116 may include a digital imaging device, a computing device, a short-range and/or long-range transceiver device, and/or a projecting device. The smart glasses 116 may maintain a bi-directional communications connection with the portable radio 104 and provide an always-on or on-demand video feed pointed in a direction of the user's 102 gaze via the digital imaging device, and/or may provide a personal display via the projection device integrated into the smart glasses 116 for displaying to its user information such as text, images, or video received from the portable radio 104 or directly from the infrastructure RAN 152. In some embodiments, an additional user interface mechanism such as a touch interface or gesture detection mechanism may be provided at the smart glasses 116 that allows the user 102 to interact with the display elements displayed on the smart glasses 116 or projected into the user's 102 eyes, or to modify operation of the digital imaging device, while in other embodiments, a display and input interface at the portable radio 104 may be provided for interacting with smart glasses 116 content and modifying operation of the digital imaging device, among other possibilities.

The smart glasses 116 may provide a virtual reality interface in which a computer-simulated reality electronically replicates an environment with which the user 102 may interact, may provide an augmented reality interface in which a direct or indirect view of real-world environments in which the user is currently disposed are augmented, i.e., supplemented, by additional computer-generated sensory input such as sound, video, images, graphics, GPS data, or other information, or may provide a mixed reality interface in which electronically generated objects are inserted in a direct or indirect view of real-world environments in a manner such that they may co-exist and interact in real time with the real-world environment and real world objects.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 may also detect whether the first responder's hand is resting on the weapon even if it has not yet been removed from the holster and provide such information to portable radio 104. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 may include its own long-range transceiver and may communicate with other communication devices and/or with the infrastructure RAN 152 or vehicular transceiver 136 directly without passing through portable radio 104.

An accelerometer is a device that measures acceleration. Single and multi-axis models are available to detect magnitude and direction of the acceleration as a vector quantity, and can be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and can be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 120 itself, or disposed separately and communicate with the sensor wristband 120 via a short range wireless or wired connection. The breathing rate sensor may include use of differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 120 is shown in FIG. 1 as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor.

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, or other short-range wireless protocol having a transmission range on the order of meters, tens of meters, or hundreds of meters.

The portable radio 104 and/or RSM video capture device 106 (or any other device in FIG. 1 for that matter) may each include a location determination device integrated with or separately disposed but communicably coupled to the portable radio 104 and/or RSM 106 and/or in respective receivers, transmitters, or transceivers of the portable radio 104 and RSM 106 for determining a location of the portable radio 104 and RSM 106. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location (and/or orientation) can then be stored locally and/or transmitted via the transmitter or transceiver to other computing devices and/or to the infrastructure RAN 152.

The vehicle 132 may include the mobile computing device 133, the vehicular video camera 134 and/or microphone 135, the vehicular transceiver 136, and the head and/or eye-tracking device 139, all of which may be coupled to one another via a wired and/or wireless vehicle area network (VAN), perhaps along with other sensors physically or communicatively coupled to the vehicle 132. The vehicular transceiver 136 may include a long-range transceiver for directly wirelessly communicating with mobile computing devices such as the portable radio 104, the RSM 106, and the laptop 114 via wireless link(s) 142 and/or for wirelessly communicating with the infrastructure RAN 152 via wireless link(s) 144. The vehicular transceiver 136 may further include a short-range wireless transceiver or wired transceiver for communicably coupling between the mobile computing device 133 and/or the vehicular video camera 134 in the VAN. The mobile computing device 133 may, in some embodiments, include the vehicular transceiver 136 and/or the vehicular video camera 134 integrated therewith, and may operate to store and/or process video and/or audio produced by the video camera 134 and/or transmit the captured video and/or audio as a video and/or audio stream to the portable radio 104, other mobile computing devices, and/or the infrastructure RAN 152 for further analysis. The omni-directional or unidirectional microphone 135, or an array thereof, may be integrated in the video camera 134 and/or at the mobile computing device 133 (or additionally or alternatively made available at a separate location of the vehicle 132) and communicably coupled to the mobile computing device 133 and/or vehicular transceiver 136 for capturing audio and storing, processing, and/or transmitting the audio in a same or similar manner as set forth above with respect to the RSM 106.

The vehicle 132 may be a human-operable vehicle, or may be a self-driving vehicle operable under control of mobile computing device 133 perhaps in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link).

The vehicle 132 and/or transceiver 136, similar to the portable radio 104 and/or respective receivers, transmitters, or transceivers thereof, may include a location (and/or orientation) determination device integrated with or separately disposed in the mobile computing device 133 and/or transceiver 136 for determining (and storing and/or transmitting) a location (and/or orientation) of the vehicle 132.

In some embodiments, instead of a vehicle 132, a land, air, or water-based drone with same or similar audio and/or video and communications capabilities and same or similar self-navigating capabilities as set forth above may be disposed, and may similarly communicate with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between, and one of the VAN and the PAN may provide infrastructure communications to the other, depending on the situation and the types of devices in the VAN and/or PAN and may provide interoperability and communication links between devices (such as video cameras) and sensors within the VAN and PAN.

Although the RSM 106, the laptop 114, the smart glasses 116, and the vehicle 132 are illustrated in FIG. 1 as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

Infrastructure RAN 152 is a radio access network that provides for radio communication links to be arranged within the network between a plurality of user terminals. Such user terminals may be mobile and may be known as 'mobile stations' or 'mobile devices,' and may include any one or more of the electronic computing devices illustrated in FIG. 1, among other possibilities. At least one other terminal, e.g. used in conjunction with mobile devices, may be a fixed terminal, e.g. a base station, eNodeB, repeater, and/or access point. Such a RAN typically includes a system infrastructure that generally includes a network of various fixed terminals, which are in direct radio communication with the mobile devices. Each of the fixed terminals operating in the RAN may have one or more transceivers which may, for example, serve mobile devices in a given region or area, known as a 'cell' or 'site', by radio frequency (RF) communication. The mobile devices that are in direct communication with a particular fixed terminal are said to be served by the fixed terminal. In one example, all radio communications to and from each mobile device within the RAN are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 may implement a WLAN technology such as Wi-Fi perhaps operating in accordance with an IEEE 802.11 standard (e.g., 802.11a, 802.11b, 802.11g) or such as a WiMAX perhaps operating in accordance with an IEEE 802.16 standard.

Infrastructure RAN 152 may further additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the BB systems, they are sometimes designated as narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure BB wireless application, enables familiar PTT and "instant on" features of traditional half-duplex mobile devices, but uses mobile devices operating over modern BB telecommunications networks. Using OMA-PoC, wireless mobile devices such as mobile telephones and notebook computers can function as PTT half-duplex mobile devices for transmitting and receiving. Other types of PTT models and multimedia call models (MMCMs) could be used as well.

Floor control in an OMA-PoC session is generally maintained by a PTT server that controls communications between two or more wireless mobile devices. When a user of one of the mobile devices keys a PTT button, a request for permission to speak in the OMA-PoC session is transmitted from the user's mobile device to the PTT server using, for example, a real-time transport protocol (RTP) message. If no other users are currently speaking in the PoC session, an acceptance message is transmitted back to the user's mobile device and the user can then speak into a microphone of the device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits (or doesn't itself distribute media but distributes unicast, multicast, and/or broadcast addresses to group communications endpoints to cause transmitted media to be routed properly and to control the floor—e.g., who is authorized to speak at any time) the auditory data packets to other users of the PoC session (e.g., to other mobile devices in the group of mobile devices or talkgroup to which the user is subscribed), using for example, one or more of a unicast, point to multipoint, or broadcast communication technique.

Infrastructure narrowband LMR wireless systems, on the other hand, may operate in either a conventional or trunked configuration. In either configuration, a plurality of mobile devices is partitioned into separate groups of mobile devices.

In a conventional narrowband radio system, each mobile device in a group is selected to a particular radio channel (frequency or frequency & time slot) for communications associated with that mobile device's group. Thus, each group is served by one channel, and multiple groups may share the same single frequency (in which case, in some embodiments, group IDs may be present in the group data to distinguish between groups using the same shared frequency).

In contrast, a trunked narrowband radio system and its mobile devices use a pool of traffic channels for virtually an unlimited number of groups of mobile devices (e.g., talkgroups). Thus, all groups are served by all channels. The trunked radio system works to take advantage of the probability that not all groups need a traffic channel for communication at the same time. When a member of a group requests a call on a control or rest channel on which all of the mobile devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the mobile devices were idling to a traffic channel for the call, and instruct all mobile devices that are not participating in the new call to move to a newly assigned control or rest channel selected from the pool of available channels. With a given number of channels, a much greater number of groups can be accommodated in a trunked radio system as compared with a conventional radio system.

Group calls may be made between wireless and/or wireline participants in accordance with either a narrowband or a BB protocol or standard or a combination of the two. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device or combination of the foregoing) a list of participants of a group at the time of the call or in advance of the call.

The group members (e.g., mobile devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, mobile devices may dynamically affiliate with a group (and also disassociate with the group) perhaps based on user input, and the switching and/or radio network may track group membership and route new group calls according to the current group membership.

In still other embodiments, the type of the call indicated in the call request may determine which other participants need to be added to the group. For example, a requested electronic digital assistant call request including an indication that it is an electronic digital assistant call may cause the receiving controller to determine what other participants (such as one or more associated dispatch consoles or radio clients as set forth herein) should be automatically added to the electronic digital assistant group call in accordance with this disclosure.

In some instances, BB and narrowband systems may be interfaced via a middleware system that translates between a narrowband PTT standard protocol (such as P25) and a BB PTT standard protocol (such as OMA-PoC). Such intermediate middle-ware may include a middleware server for performing the translations and may be disposed in the cloud, disposed in a dedicated on-premises location for a client wishing to use both technologies, or disposed at a public carrier supporting one or both technologies. For example, and with respect to FIG. 1, such a middleware server may be disposed in infrastructure RAN 152 at controller 156 or at a separate cloud computing cluster 162 communicably coupled to controller 156 via internet protocol (IP) network 160, among other possibilities.

The infrastructure RAN 152 is illustrated in FIG. 1 as providing coverage for the portable radio 104, RSM video capture device 106, laptop 114, smart glasses 116, and/or vehicle transceiver 136 via a single fixed terminal 154 coupled to a single controller 156 (e.g., radio controller, call controller, PTT server, zone controller, MME, BSC, MSC, site controller, Push-to-Talk controller, or other network device) and including first and second dispatch consoles 158, 159 operated by respective dispatchers. In other embodiments, additional fixed terminals and additional controllers may be disposed to support a larger geographic footprint and/or a larger number of mobile devices and additional dispatch consoles with respective operators may be implemented, among other possibilities.

The controller 156 illustrated in FIG. 1, or some other backend electronic computing device existing on-premises or in the remote cloud compute cluster 162 accessible via the IP network 160 (such as the Internet), may additionally or alternatively operate as a back-end electronic digital assistant, a back-end audio and/or video processing electronic computing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud compute cluster 162 may be comprised of a plurality of computing devices, such as the one set forth in FIG. 3, one or more of which may be executing none, all, or a portion of an electronic digital assistant service, sequentially or in parallel, across the plurality of computing devices. The plurality of computing devices comprising the cloud compute cluster 162 may be geographically co-located or may be separated by inches, meters, or miles, and inter-connected via electronic and/or optical interconnects. Although not shown in FIG. 1, one or more proxy servers or load-balancing servers may control which one or more computing devices perform any part or all of the electronic digital assistant function.

Finally, although FIG. 1 describes a communication system 100 generally as a public safety communication system including a user 102 generally described as a police officer and vehicle 132 generally described as a police cruiser, in other embodiments, the communications system 100 may additionally or alternatively be a retail communications system including a user 102 that may be an employee of a retailer and a vehicle 132 that may be a vehicle for use by the user 102 in furtherance of the employee's retail duties (e.g., a shuttle or self-balancing scooter). In other embodiments, the communications system 100 may additionally or alternatively be a warehouse communications system including a user 102 that may be an employee of a warehouse and a vehicle 132 that may be a vehicle for use by the user 102 in furtherance of the employee's retail duties (e.g., a forklift).

In still further embodiments, the communications system 100 may additionally or alternatively be a private security communications system including a user 102 that may be an employee of a private security company and a vehicle 132 that may be a vehicle for use by the user 102 in furtherance of the private security employee's duties (e.g., a private security vehicle or motorcycle). In even further embodiments, the communications system 100 may additionally or alternatively be a medical communications system including a user 102 that may be a doctor or nurse of a hospital and a vehicle 132 that may be a vehicle for use by the user 102 in furtherance of the doctor or nurse's duties (e.g., a medical gurney or ambulance). In a last example embodiment, the communications system 100 may additionally or alternatively be a heavy machinery communications system including a user 102 that may be a miner, driller, or extractor at a mine, oil field, or precious metal or gem field and a vehicle 132 that may be a vehicle for use by the user 102 in furtherance of the miner, driller, or extractor's duties (e.g., an excavator, bulldozer, crane, or front loader). Other possibilities exist as well.

b. Device Structure

Figure 3:
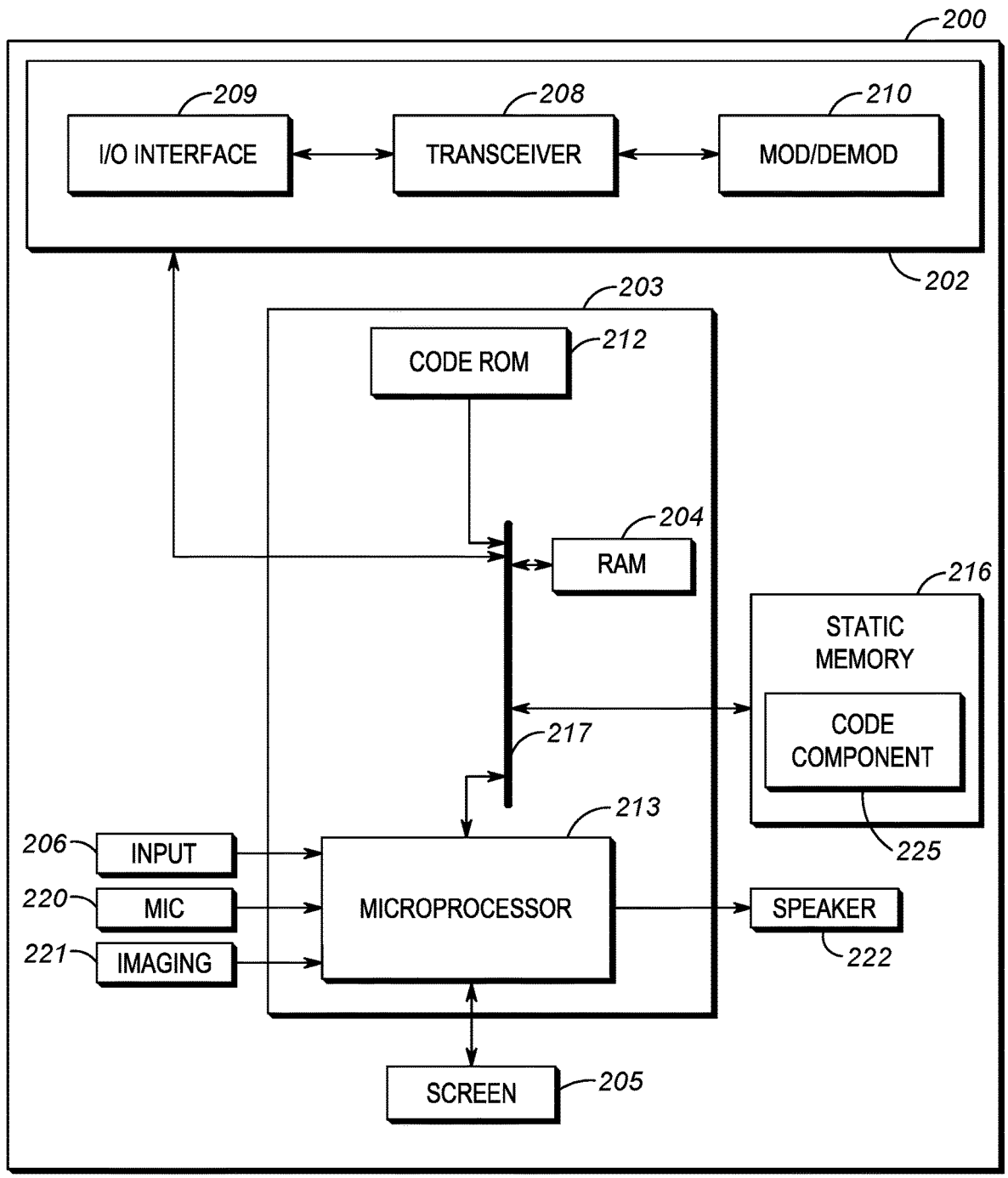
FIG. 3 is a device diagram showing a device structure of a controller electronic computing device for performing one or more of the steps set forth in FIG. 5, in accordance with some embodiments.

FIG. 3 sets forth a schematic diagram that illustrates a communication device 200 according to some embodiments of the present disclosure. The communication device 200 may be, for example, embodied in the portable radio 104 of FIG. 1, the RSM video capture device 106, the laptop 114, the mobile computing device 133, the infrastructure controller 156, the first dispatch console 158, the second dispatch console 159, one or more computing devices in the cloud computing cluster 162, the communication devices 200A-200C of FIG. 2, an electronic digital assistant 420 of FIG. 4, or some other communication device not illustrated in FIG. 1, and/or may be a distributed communication device across two or more of the foregoing (or multiple of a same type of one of the foregoing) and linked via a wired and/or wireless communication link(s). In some embodiments, the communication device 200 (for example, the portable radio 104) may be communicatively coupled to other devices such as the sensor-enabled holster 118 as described above. In such embodiments, the combination of the portable radio 104 and the sensor-enabled holster 118 may be considered a single communication device 200.

While FIG. 3 may also represent the communication devices 200A-200C described above with respect to FIG. 2, depending on the type of the communication device, the communication device 200 may include fewer or additional components in configurations different from that illustrated in FIG. 3. For example, in some embodiments, the communication device 200 acting as the infrastructure controller 156 of FIG. 1 may not include one or more of the screen 205, microphone 220, imaging device 221, and speaker 222. As another example, in some embodiments, the communication device 200 acting as the portable radio 104 of the RSM video capture device 106 of FIG. 1 may further include a location determination device (for example, a global positioning system (GPS) receiver) as explained above. Other combinations are possible as well.

As shown in FIG. 3, the communication device 200 includes a communications unit 202 coupled to a common data and address bus 217 of a processing unit 203. The communication device 200 may also include one or more input devices (for example, keypad, pointing device, touch-sensitive surface, button, a microphone 220, an imaging device 221, and/or another input device 206) and an electronic display screen 205 (which, in some embodiments, may be a touch screen and thus also acts as an input device), each coupled to be in communication with the processing unit 203. Input device 206 may further include a dedicated electronic digital assistant input hard or soft switch, button, or other mechanism for activation by a user of the communication device 200 to indicate that the user wishes to interface with a local, remote, or distributed electronic digital assistant across come combination of the foregoing.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as the portable radio 104, the laptop 114, the wireless RAN 152, and/or the mobile computing device 133.

For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the microphone 220, the imaging device 221, the other input device 206, and/or the speaker 222. Static memory 216 may store operating code 225 for the electronic processor 213 that, when executed, performs one or more of the steps set forth in FIG. 5 and the accompanying text. The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

c. Emergency Response System Architecture

Figure 4:
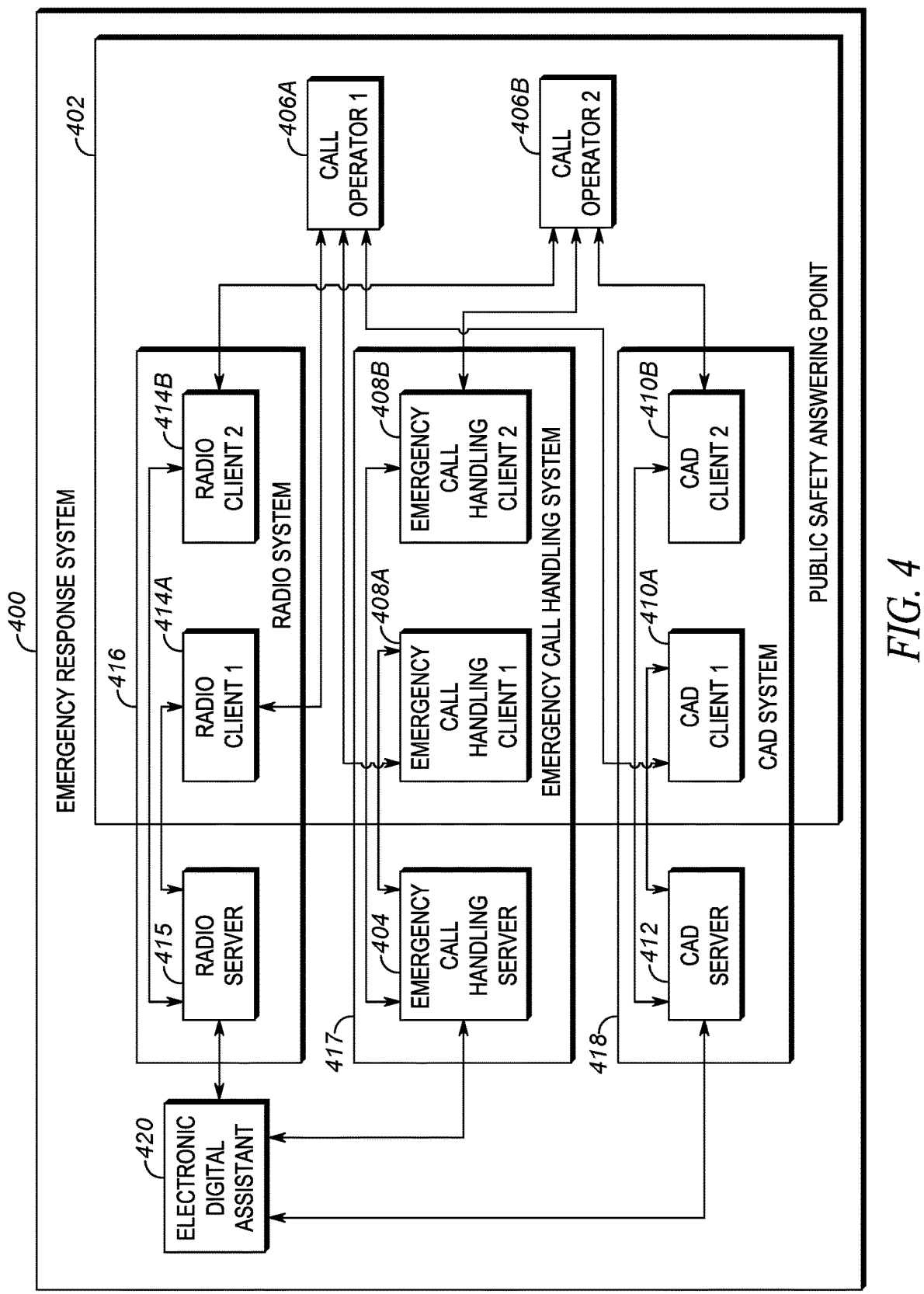
FIG. 4 is a block diagram of an emergency response system, in accordance with some embodiments.

FIG. 4 is a block diagram of an emergency response system 400 used in accordance with some embodiments. Emergency response system 400 illustrates an example inter-connected set of a radio dispatch system 416 (hereinafter, radio system 416), emergency call handling system 417, and computer-aided dispatch (CAD) system 418, operable via human or automated call operators 406A, 406B, to aid in responding to public safety and other types of incidents. While the emergency response system 400 illustrates a particular number of systems and computing devices, in other embodiments, more or fewer systems and computing devices and/or perhaps converged systems and computing devices could be used. For example, and in some embodiments, the first radio client 414A and the first CAD client 410A may be converged into a single radio and CAD dispatch client operated by a single operator. And while the emergency response system 400 illustrates a particular number of call operators 406A and 406B, in other embodiments, more or fewer call operators may be present, including embodiments in which separate operators are assigned to each function (e.g., radio, CAD, emergency phone call handling) and/or each device station.

The radio system 416 includes first and second radio clients 414A and 414B (e.g., dispatch consoles), and a radio server 415 for controlling and coordinating across radio clients 414A and 414B and accessing a radio access network (RAN). The first and second radio clients 414A and 414B may correspond, for example, to the first and second dispatch consoles 158 and 159 of FIG. 1, among other possibilities. The first and second radio clients 414A and 414B may be configured, as one example, to allow respective call operators 406A, 406B (e.g., acting as dispatch operators) at radio clients 414A and 414B to communicate with TG_A 122 (and thus radio 104) and TG_B 138 (and thus vehicular transceiver 136) in FIG. 1 via RAN 152. The radio server 415 may correspond, as one example, to controller 156 of FIG. 1, or may be a separate device that may interface with controller 156 of FIG. 1 via IP networks 160, among other possibilities.

Each radio client 414A and 414B may be assigned a unique identifier, and may provide its unique identifier when transmitting a message to radio server 415 identifying one or more talkgroups to which the radio client wishes to subscribe and monitor and/or participate in the exchange of talkgroup media. The message may indicate one or more primary talkgroups and the same or a separate message may indicate one or more secondary (e.g., to which it may be configured to playback received talkgroup media if no primary talkgroups are active) talkgroups. The message may further indicate whether the particular radio client would like to be added to all EDA TGs associated with members of just its one or more primary TGs or EDA TGs associated with members of its secondary TGs as well. Furthermore, the same or a separate message may indicate one or more agencies by name or unique identifier with which the particular radio client is associated in the case of a shared multi-agency emergency response system 400. As just one example, the first dispatch console 158 of FIG. 1 and/or the first radio client 414A of FIG. 4 may transmit a message including its own unique identifier "RC_7X2U", an identification of the primary TG it wishes to subscribe to "TG_A", and perhaps an indication of an agency with which it is associated "COOK_POLICE_1". In another example, the first dispatch console 158 of FIG. 1 and/or the first radio client 414A of FIG. 4 may transmit a message including its own unique identifier "RC_7X2U", which the receiving controller 156 of FIG. 1 or radio server 415 of FIG. 4 may index into a pre-stored mapping or database to identify a default primary TG pre-configured at the receiving controller 156 of FIG. 1 or radio server 415 of FIG. 4 as associated with the unique identifier, and perhaps similarly index into a same or different pre-stored mapping or database to identify a default agency pre-configured at the receiving controller 156 of FIG. 1 or radio server 415 of FIG. 4 as associated with the unique identifier.

In-field users such as radio 104 may somewhat similarly transmit affiliation messages via RAN 152 for receipt by controller 156 or radio server 415 during registration with the RAN 152 that may set forth a primary talkgroup with which the radio 104 wishes to be affiliated and/or one or more secondary talkgroups with which the radio 104 wishes to subscribe or monitor. All agency, affiliation, subscription, and association information of in-field users and radio clients may be stored at controller 156 or radio server 415. As just one example, the radio 104 of FIG. 1 may register and affiliate with RAN 152 and transmit a message including its unique radio identifier "RAD_8Z9T", an indication of the primary TG it wishes to affiliate to "TG_A", and perhaps an indication of an agency with which it is associated "COOK_POLICE_1." The message may be transmitted consistent with any one or more of the wireless protocols already set forth herein, for example. Similarly, when an in-field user such as user 102 switches a dial or soft switch on his or her radio 104 to affiliate with a new or different TG, a new TG affiliation message may be sent via RAN 152 to update the network.

The emergency call handling system 417 includes first and second call handling clients 408A and 408B, and an emergency call handling server 404 for controlling and coordinating across first and second call handling clients 408A and 408B. The emergency call handling server 404 may also correspond, for example, to controller 156 of FIG. 1, or may be an entirely spate device perhaps also coupled to a plain-old-telephone (POTS) switched telephone network, among other possibilities. Call operators 406A, 406B may use first and second call handling clients 408A and 408B to field emergency calls, such as 9-1-1 calls, and interact with callers to receive and enter incident information into the respective client 408A, 408B for storage and access at server 404 and further access by other devices in the emergency response system 400 such as EDA 420, radio server 415, or CAD server 412.

The CAD system 418 includes first and second CAD clients 410A and 410B, and a CAD server 412 for controlling and coordinating across first and second CAD clients 410A and 410B. The CAD server 412 may also correspond, for example, to controller 156 of FIG. 1, or may be an entirely separate device perhaps embodied fully or partially at cloud computer cluster 162, among other possibilities. Call operators 406A, 406B may use first and second CAD clients 410A and 410B to monitor and enter real-time incident (status, context, etc.) and location information (incident, first responder, etc.), electronically dispatch first responder resources, enter event notes, record and track the status of field units, and/or document call and/or incident resolution and disposition.

An electronic digital assistant 420 computing device is illustrated in FIG. 4 as a separate entity for ease of illustration, but in other embodiments, may be integrated into one of the radio server 415, the emergency call handling server 404, or the CAD server 412, or distributed across one or more of the radio server 415, the emergency call handling server 404, the CAD server 412 or other computing devices in the emergency response system in a distributed processing manner. In still other embodiments, functions of one or more, or all, of the radio server 415, the emergency call handling server 404, the CAD server 412 or other computing devices in the emergency response system may be integrated into the electronic digital assistant 420 computing device. Still further, some or all of the EDA 420 may be implemented at cloud computer cluster 162 of FIG. 1 and may be made accessible to one, some, or all of the radio server 415, the emergency call handling server 404, and the CAD server 412, among others, via an IP network such as IP network 160 of FIG. 1. The electronic digital assistant is configured to receive real-time audio and/or video queries from in-field users such as user 102 and/or 131 of FIG. 1, via RAN 152, and via access to stored information at the electronic digital assistant 420 and/or servers 415, 404, 412, automatically and intelligently respond to queries and/or proactively assist in-field users such as user 102 and/or 131 of FIG. 1 with voice or audio/video content. Data generated at each of the radio, emergency call handling, and CAD systems 416, 417, 418, as noted above, is advantageously stored at respective servers 415, 404, 412, such that the electronic digital assistant 420 can access such stored information.

2. PROCESSES FOR DYNAMIC DISPATCHER ELECTRONIC DIGITAL ASSISTANT MONITORING IN A GROUP-BASED MOBILE RADIO SYSTEM

Figure 5:
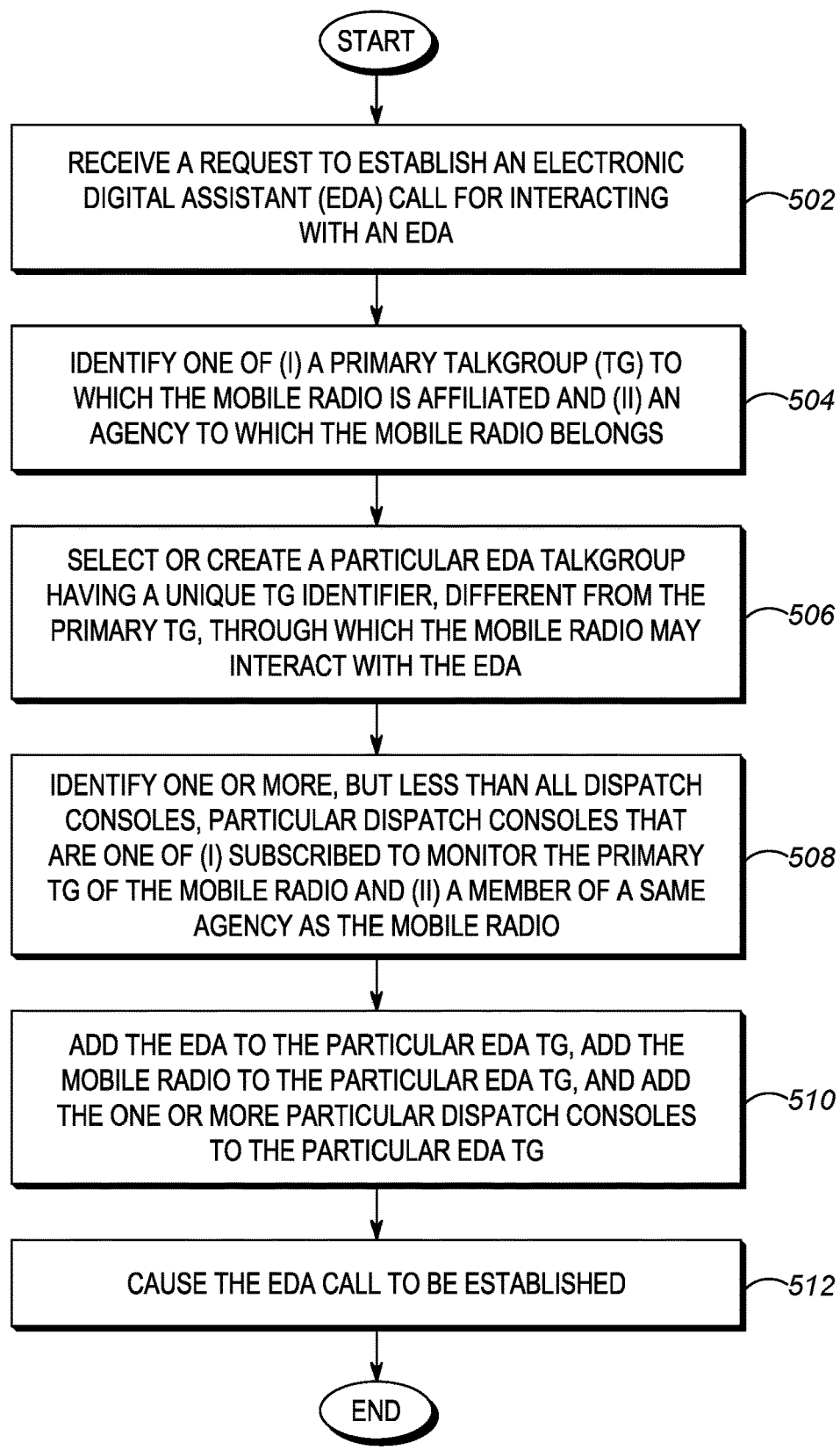
FIG. 5 illustrates a flowchart setting forth process steps for operating the controller of FIG. 1 or 3 or the radio server of FIG. 4, in accordance with some embodiments.

Turning now to FIG. 5, a flowchart diagram illustrates a process 500 for a controller computing device for communicatively coupling between end user communication device(s) initiating an electronic digital assistant session and one or more dispatch consoles associated with the end user communication device(s) so that commanders, dispatchers, or other command or monitoring-type users may be automatically joined to monitor electronic digital assistant sessions of users that they are associated with. While a particular order of processing steps, message receptions, and/or message transmissions is indicated in FIG. 5 for exemplary purposes, timing and ordering of such steps, receptions, and transmissions may vary where appropriate without negating the purpose and advantages of the examples set forth in detail throughout the remainder of this disclosure.

The controller computing device executing process 500 may include a controller same or similar to controller 156 of FIG. 1, same or similar to computing device 200 of FIG. 2, same or similar to radio server 415 of FIG. 4, or same or similar to cloud computer cluster 162 of FIG. 1, or may include two or more of the foregoing operating in a distributed computing manner, among other possibilities.

Process 500 begins at step 502 where the controller computing device receives a request to establish an electronic digital assistant (EDA) call for interacting with an EDA. The request received at step 502 may be generated and transmitted by an in-field user (e.g., end-user device currently assigned a task or incident or otherwise patrolling or performing some other work-related function) radio such as radio 104 of FIG. 1 in response to activation of a dedicated EDA soft or hard button disposed at the radio 104 and configured to be operated by a user thereof when the user wishes to interface with an EDA at the radio 104, in the RAN 152, or at the cloud computer cluster 162 (or some combination of the foregoing), among other possibilities. The request may contain a particular opcode that identifies the request as an EDA request, and may contain other information such as a location of the mobile radio, a radio identifier of the mobile radio, an identity of a user associated with the mobile radio, and other contextual information generated by any one or more of the sensor devices described above with respect to FIG. 1 and which may be useful for the EDA in formulating a response to a subsequently provided EDA user query (via voice or audio/video content). The request may be received over an existing control or rest LMR channel, or may be received over an existing or a dynamically established unicast BB channel or other medium, among other possibilities. Continuing with the example set forth above, the request received at step 502 may be a request from user 102 generated by radio 104 in response to a dedicated EDA button depressed at the radio 104 and indicative of the user's 102 desire to interact with an EDA.

At step 504, and in response to receiving the request at step 502, the controller computing device identifies one of (i) a primary TG to which the mobile radio is affiliated and (ii) an agency to which the mobile radio belongs. As set forth earlier with respect to FIG. 1, as each mobile radio affiliates with the network, it may provide a message indicating its primary TG, an agency to which it belongs, and/or a unique radio identifier (which itself may be used to identify the associated primary TG and/or agency, in accordance with the foregoing description and in place of including such information in the message). The receiving controller such as controller 156 of FIG. 1 or radio server 415 of FIG. 4 may store the information in a mobile radio to TG and/or mobile radio to agency mapping or other type of database. In other embodiments, the receiving controller may use the radio's unique received radio identifier to access a locally or remotely stored mapping or other type of database to determine, as a function of the radio identifier, the mobile radio's default affiliated TG and/or associated agency. The TG to which the mobile radio is affiliated could be an LMR talkgroup, a BB talkgroup, or a hybrid LMR/BB talkgroup. Other possibilities exist as well.

At step 506, the controller computing device selects or creates a particular EDA TG having a unique TG identifier, different from the primary TG, through which the mobile radio may interact with the EDA. In some embodiments, such as when the mobile radio is a BB network mobile radio, the controller may randomly generate a unique TG session identifier different from the mobile radio's primary TG session identifier for the purposes of facilitating the mobile radio's interactions with the EDA. In other embodiments, such as when the mobile radio is an LMR network mobile radio, the controller may select a TG identifier from a set of existing reserved TG identifiers for EDA use and for the purposes of facilitating the mobile radio's interactions with the EDA. Other examples are possible as well.

Where a pool of available trunked talkgroups are reserved for electronic digital assistant use, and where it is determined that no trunked talkgroups reserved for electronic digital assistant use are available, the controller may delay assigning an electronic digital assistant talkgroup to the mobile radio until one becomes available and may provide a notification to the mobile radio that no EDA TGs are currently available.

At step 508, the controller computing device identifies one or more, but less than all dispatch consoles, particular dispatch consoles that are one of (i) currently subscribed to monitor the current primary TG of the mobile radio and (ii) a member of a same agency as the mobile radio.

As set forth earlier with respect to FIG. 4, each dispatch console 158, 159 or radio client 414A, 414B may provide a message or messages to controller 156 or radio server 415, respectively, indicating one or more primary talkgroups, one or more secondary (e.g., to which it will only playback received talkgroup media if no primary talkgroups are active) talkgroups, and one or more agencies by name or unique identifier with which the particular dispatch console/ radio client is associated. The receiving controller such as controller 156 of FIG. 1 or radio server 415 of FIG. 4 may store the information in a dispatch console/radio client to TG and/or dispatch console/radio client to agency mapping or other type of database. In other embodiments, the receiving controller may use the dispatch console/radio client's unique received identifier to access a locally or remotely stored mapping or other type of database to determine, as a function of the identifier, the dispatch console/radio client's default associated (or subscribed) TG and/or associated agency.

Accordingly, at step 508, the controller may identify, by accessing and comparing stored TG affiliations (mobile radio) and subscriptions (dispatch consoles) in the local or remotely stored mapping or other database as set forth above, those dispatch consoles/radio clients (less than all dispatch consoles), by unique identifier, that have subscribed to a same TG (as a sole TG or as a primary TG) that the mobile radio had affiliated to during registration. In some embodiments, the sole or primary TG to which the mobile radio had affiliated may be any historical sole or primary TG to which the mobile radio has ever affiliated, or may be a most recent sole or primary TG to which the mobile radio has most recently affiliated. Other examples are possible as well.

In addition to primary TGs, there may be some instances where a particular dispatch console or radio client identifies one or more secondary (e.g., to which it will only playback received talkgroup media if no primary talkgroups are active) talkgroups. At step 508, and depending on a configuration of the controller or on contents of a message received from a respective dispatch console/radio client, the controller may identify, by accessing and comparing stored TG affiliations (mobile radio) and subscriptions (dispatch consoles) in the local or remotely stored mapping or other database as set forth above, one or more additional dispatch consoles/radio clients (less than all dispatch consoles), by unique identifier, that have subscribed to a same TG (as a secondary TG) that the mobile radio had affiliated to (i.e., as a sole TG or primary TG) during registration in the same or similar manner as set forth immediately above with respect to primary dispatch console or radio client talkgroups. In some embodiments, the controller may add such dispatch consoles/radio clients subscribed to the same secondary TG as the mobile radio affiliated to without regard to other information, while in other embodiments, the controller may consider additional context and only add dispatch consoles/radio clients subscribed to the same secondary TG when those dispatch consoles/radio clients have below a threshold load or are not involved in any incidents or communications with TGs listed as primary TGs for each dispatch console/radio client, among other possibilities including but not limited to a location of the mobile device relative to a particular dispatch console location (e.g., a closest suitable dispatch console at a closest PSAP). In still other embodiments, the controller may refrain from adding dispatch consoles/radio clients subscribed to the same secondary TG (for EDA TG purposes).

Additionally or alternatively, the controller may identify at step 508, by accessing and comparing stored agency associations (between mobile radio and dispatch consoles) in the local or remotely stored mapping or other database as set forth above, those dispatch consoles (less than all dispatch consoles), by unique identifier, that have indicated an association with a same agency as the mobile radio. This is especially useful in those instances where a single public safety answering point, such as the PSAP 402 set forth in FIG. 4, supports multiple agencies such as local police, fire, and medical response agencies, and a particular dispatch console or radio client (out of a plurality of dispatch consoles or radio clients) may be assigned to supporting a particular one of the agencies at the shared PSAP 402.

In a still further example where a single PSAP 402 supports a single agency, but multiple different tasks or intra-agency groups of users within that agency, such task information or group of user information may be stored similarly to agency information set forth above and used to select a particular dispatch console/radio client at step 508 matching a task or group associated with a mobile radio. Other possibilities exist as well.

At step 510, the controller computing device adds the EDA to the particular EDA TG, adds the mobile radio to the particular EDA TG, and adds the one or more particular dispatch consoles to the particular EDA TG. Adding each device to the particular EDA TG may include associating each device's unique identifier (e.g., hardware address, login credentials, username, or other unique identifier) with the unique TG identifier selected or created at step 506. In the event that the EDA is embodied at a device remote from the controller, the hardware address or other unique identifier associated with the device may be added to the EDA TG. In the event that the EDA is embedded within or operating at the controller itself, an API identifier or session identifier or other identifier for uniquely identifying a routing target for received audio and/or visual media from the mobile radio to the EDA may be included in the EDA TG target participant list.

TABLE I

EXAMPLE EDA TG TO PARTICIPANT MAPPING

| EDA TG IDENTIFIER | PARTICIPANTS (TYPE) |
|---|---|
| EDA_POLICE_1 | RAD_8Z9T (mobile radio) |
| | RC_7X2U (dispatch console/client radio) |
| | EDA_1092 (EDA device) |

An example talkgroup to participant mapping is set forth above in Table I. As illustrated, a mobile radio such as radio 104 with hardware identifier RAD_8Z9T requested an EDA TG call, a unique TG identifier EDA_POLICE_1 was selected or created at step 506 for the EDA TG call, the dispatch console 158 or radio client 414A associated with the radio 104 and having a hardware identifier of RC_7X2U is added to the EDA TG, the mobile radio requesting the EDA TG call is added to the EDA TG, and the hardware identifier of the EDA device itself (EDA_1092) is added to the EDA TG.

At step 512, the controller computing device causes the EDA call to be established. Causing the EDA call to be established may be performed in a number of different ways depending upon the underlying technology and network architecture, but generally involves establishing physical wired or wireless links as necessary between the members of the group in accordance with any of the wired or wireless network technologies as set forth herein, establishing routing paths between the members of the group in accordance with any of the protocols as set forth herein, and providing notice to each participating device in the group that the call has been or will be granted. Establishing the call may further include granting the floor (e.g., permission to talk) to the mobile radio and managing subsequent floor requests in the group.

As one example, in an LMR system, causing the EDA call to be established may include the controller requesting assignment of (via a zone controller) or assigning (where the controller is the zone controller itself) an LMR trunked channel (from a pool of available trunked channels) to the EDA TG and notifying the mobile radio of the assigned LMR trunked channel for the EDA call. Further, the controller may establish multicast routes at switches and/or routers between the participants in the EDA call such that audio and/or video transmitted by any one member of the EDA TG is routed and provided to all other members of the EDA TG. For example, audio and/or video transmitted by the mobile radio over the assigned LMR trunked channel is routed to the participant devices (including the EDA and the identified dispatch console(s)/radio client(s)) in the EDA TG over IP networks.

As another example, in a BB system, causing the EDA call to be established may include the controller identifying an existing LTE channel already assigned to the mobile radio for reuse during the EDA call or requesting assignment of (via an evolved packet core (EPC) controller) or assigning (where the controller is the EPC controller itself) an LTE unicast or MBMS multicast channel to the EDA TG and notifying the mobile radio of the assigned LTE channel for the EDA call. Further, the controller may establish multicast routes at switches and/or routers between the participants in the EDA call such that audio and/or video transmitted by any one member of the EDA TG is routed and provided to all other members of the EDA TG. For example, audio and/or video transmitted by the mobile radio over the assigned LTE channel is routed to the participant devices (including the EDA and the identified dispatch console(s)/radio client(s)) in the EDA TG over IP networks.

In those instances where the EDA call is established as a full-duplex TG where any user may speak at any time, each device in the TG may apply priority rules that determine which audio gets played back at all, or which audio may be played back at a higher priority (such as a higher volume) relative to other simultaneous or overlapping speakers or content, if any. In those instances where the EDA call is established as a half-duplex TG where only a speaker granted a floor by the controller is allowed to speak at a time (with perhaps some limited exceptions for emergency or other high priority audio), the floor may be initially granted to the mobile radio, after which during a hangtime other participants in the EDA TG can request the floor (such as the EDA if it has retrieved an answer to the request, or a dispatcher or radio client user if that person knows an answer to the request or wishes to provide further clarity or refute an answer already provided by the EDA after a hangtime after the EDA has provided audio or audio/video content to the EDA TG). The controller may be configured to withdraw or refrain from granting a floor to the EDA when a request for the floor has been received or granted to the dispatch console/radio client in the EDA TG.

Each dispatch console/radio client may be configured to play back EDA TG content at a lower priority (such as a lower volume) than primary and/or secondary TG audio or audio/video content to which the dispatch console/radio client is subscribed, while in other configurations, and perhaps based on context or content, the EDA TG content may be selectively played back at a higher priority (such as a higher volume).

The EDA call caused to be established at step 512 may subsequently end in a number of ways. For example, a normal call hangtime may pass without any other member of the EDA TG speaking or providing audio or audio/video to the EDA TG, after which the controller may cause an end of the call message to be transmitted to all participants in the call effectively unsubscribing all participants (for example, and using the example EDA TG EDA_POLICE_1 above, including the radio 104 with hardware identifier RAD_8Z9T, the dispatch console 158 or radio client 414A associated with the radio 104 having a hardware identifier of RC_7X2U, and the EDA device itself having the hardware identifier or EDA_1092) and causing the created EDA TG to be disabled, terminated, deleted, or otherwise returned to the pool of available reserved EDA TGs.

Although examples above focused on radio 104 and TG_A to which radio 104 is primarily affiliated (and vehicular transceiver 136 is not), same or similar processes as set forth above in FIG. 5 and process 500 would apply even in those embodiments where radio 104 and vehicular transceiver 136 both affiliate to a same primary talkgroup (such as both affiliating to TG_Z 180 as a primary talkgroup instead of as a secondary talkgroup as in the earlier examples above). More specifically, even in the event that the user 102 presses the EDA button at radio 104, the created EDA TG would include radio 104, the respective EDA, and the one or more associated dispatch consoles or radio clients, and would not include other members of the (now) primary talkgroup TG_Z 180 such as vehicular transceiver 136. In other embodiments, and perhaps based on a context associated with the user 102, the radio 104, and/or the contents of the EDA request, other users of the requestor/radio 104's primary affiliated talkgroup TG_Z 180 may subsequently be added to the EDA TG so that they too can hear the request (perhaps repeated for any newly joined users) and/or hear the EDA response (and perhaps any dispatch console or radio client supplementation or modification to the EDA response) before tearing down the EDA TG. Other possibilities exist as well.

3. CONCLUSION

In accordance with the foregoing, an improved device, method, and system is disclosed for a group-based communications model including a controller for communicatively coupling between end user communication device(s) initiating an electronic digital assistant session and one or more dispatch consoles associated with the end user communication device(s) so that commanders, dispatchers, or other command or monitoring-type users may be automatically joined to monitor electronic digital assistant sessions of users that they are associated with, among other technical benefits and advantages.

As a result of the foregoing, and in some embodiments, electronic digital assistant interactions by member edge devices may be monitored and a dispatcher or radio client user may remain fully informed of progress in an incident or additional information related to an incident that may have conventionally be provided directly to the requesting user without the dispatcher or radio client user's knowledge, putting the dispatcher or radio client user at a disadvantage when attempting to assist the requesting user in the future and potentially requiring the user to bring the dispatcher or radio client user up to speed in sometimes difficult or dangerous environments or circumstances. Other features and advantages are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for dynamic dispatcher electronic digital assistant monitoring in a group-based mobile radio system, the method comprising:
    receiving, at a radio controller electronic processing device from a mobile radio, a request to establish an electronic digital assistant call for interacting with an electronic digital assistant;
    identifying, by the radio controller, one of (i) a primary talkgroup to which the mobile radio is affiliated out of a plurality of available talkgroups and (ii) an agency to which the mobile radio belongs out of a plurality of available agencies;
    selecting or creating, by the radio controller, a particular electronic digital assistant talkgroup having a unique talkgroup identifier, different from the primary talkgroup, through which the mobile radio may interact with the electronic digital assistant;
    identifying, by the radio controller, one or more, but less than all of a plurality of dispatch consoles, particular dispatch consoles that are one of (i) subscribed to monitor the primary talkgroup of the mobile radio out of the plurality of available talkgroups and (ii) a member of a same agency as the mobile radio out of the plurality of available agencies; and
    responsive to receiving the request, causing, by the radio controller, the electronic digital assistant call to the particular electronic digital assistant talkgroup to be established including:
        the electronic digital assistant;
        the mobile radio; and
        the one or more particular dispatch consoles to allow one or more associated dispatchers operating the respective one or more particular dispatch consoles to monitor the mobile radio's interactions with the electronic digital assistant during the electronic digital assistant call.

2. The method of claim 1, wherein
    the selecting or creating the particular electronic digital assistant talkgroup having the unique talkgroup identifier through which the mobile radio may interact with the electronic digital assistant comprises assigning a land mobile radio (LMR) trunked talkgroup from a pool of reserved trunked talkgroups to the particular electronic digital assistant talkgroup; and causing the electronic digital assistant call to be established comprises:

causing a land mobile radio trunked channel to be assigned to the electronic digital assistant talkgroup from a pool of available trunked channels; and causing media transmitted by the mobile radio over the assigned trunked channel to be routed to the respective one or more particular dispatch consoles for monitoring by the one or more associated dispatchers.

3. The method of claim 2, wherein the pool of available trunked talkgroups are reserved for electronic digital assistant use, and responsive to determining that no trunked talkgroups reserved for electronic digital assistant use are available, delaying assigning the particular electronic digital assistant talkgroup to the mobile radio until one becomes available.

4. The method of claim 1, wherein:

the selecting or creating the particular electronic digital assistant talkgroup having the unique talkgroup identifier through which the mobile radio may interact with the electronic digital assistant comprises assigning a unique broadband talkgroup session identifier to the particular electronic digital assistant talkgroup; and the causing the electronic digital assistant call to be established comprises causing media transmitted by the mobile radio using the assigned unique broadband talkgroup session identifier to be routed to the respective one or more particular dispatch consoles for monitoring by the one or more associated dispatchers.

5. The method of claim 1, wherein the identifying the primary talkgroup to which the mobile radio is affiliated comprises accessing, by the radio controller, a local mobile radio to talkgroup mapping that sets forth, for each mobile radio in the mobile radio system, a primary talkgroup to which the mobile radio is affiliated.

6. The method of claim 5, the method further comprising the radio controller receiving, from the mobile radio upon the mobile radio's registration with the mobile radio system, an indication of the primary talkgroup to which the mobile radio is affiliated, and the radio controller responsively updating the local mobile radio to talkgroup mapping to reflect the received indication of the primary talkgroup to which the mobile radio is affiliated.

7. The method of claim 1, the method further comprising causing, by the radio controller, media generated and transmitted by the mobile radio to the particular electronic digital assistant talkgroup to be routed to the electronic digital assistant and to the respective one or more particular dispatch consoles for monitoring by the one or more associated dispatchers.

8. The method of claim 7, wherein the media generated by the mobile radio is voice audio.

9. The method of claim 7, further comprising causing, by the radio controller, a media response generated and transmitted by the electronic digital assistant to the particular electronic digital assistant talkgroup to be provided to the mobile radio and to the respective one or more particular dispatch consoles for monitoring by the one or more associated dispatchers.

10. The method of claim 1, wherein the identifying the one or more, but less than all, particular dispatch consoles out of the plurality of dispatch consoles that are subscribed to monitor the primary talkgroup out of the plurality of available talkgroups comprises accessing, by the radio controller, a local dispatch console to talkgroup mapping that sets forth, for each dispatch console in the mobile radio system, one or more primary talkgroups to which the dispatch console is subscribed.

11. The method of claim 10, wherein the local dispatch console to talkgroup mapping further sets forth, for each dispatch console in the mobile radio system, one or more secondary talkgroups out of the plurality of available talkgroups to which the dispatch console is subscribed to monitor at a lower priority than the one or more primary talkgroups; and wherein the identifying the one or more, but less than all, particular dispatch consoles out of the plurality of dispatch consoles that are subscribed to monitor the primary talkgroup out of the plurality of available talkgroups further comprises accessing, by the radio controller, the local dispatch console to talkgroup mapping that sets forth, for each dispatch console in the mobile radio system, the one or more secondary talkgroups to which the dispatch console is subscribed.

12. The method of claim 10, wherein the local dispatch console to talkgroup mapping further sets forth, for each dispatch console in the mobile radio system, one or more secondary talkgroups out of the plurality of available talkgroups to which the dispatch console is subscribed to monitor at a lower priority than the one or more primary talkgroups; and wherein the identifying the one or more, but less than all, particular dispatch consoles out of the plurality of dispatch consoles that are subscribed to monitor the primary talkgroup further comprises refraining from including, for each dispatch console in the mobile radio system, the one or more secondary talkgroups to which the dispatch console is subscribed.

13. The method of claim 1, further comprising causing, by the radio controller, second media generated and transmitted from a first one of the respective one or more particular dispatch consoles to the particular electronic digital assistant talkgroup to be routed to the mobile radio.

14. The method of claim 13, further comprising withdrawing or refraining from granting a floor to the electronic digital assistant while the first one of the respective one or more particular dispatch consoles continues to transmit the second media.

15. The method of claim 1, further comprising detecting, by the radio controller, an end to the particular electronic digital assistant call, unsubscribing the mobile radio, the electronic digital assistant, and the one or more particular dispatch consoles to the particular electronic digital assistant talkgroup and returning the unique talkgroup identifier to a pool of available unique talkgroup identifiers for new electronic digital assistant calls.

16. The method of claim 1, wherein the one or more particular dispatch consoles are selected from a plurality of dispatch consoles supporting multiple different public safety agencies at a same public safety answering point (PSAP).

17. The method of claim 1, wherein the one or more particular dispatch consoles are selected from a plurality of dispatch consoles supporting multiple different tasks or groups within a single public safety agency.

18. The method of claim 1, wherein the group-based mobile radio system is one of an Association of Public-Safety Communications Officials (APCO) P25, Digital Mobile Radio (DMR), and Terrestrial Trunked Radio (TETRA) trunked radio system.

19. A radio controller electronic processing device for electronic digital assistant monitoring in a group-based mobile radio system, the electronic processing device comprising:
- a memory;
- a transceiver; and
- one or more processors configured to:
  - receive, via the transceiver from a mobile radio, a request to establish an electronic digital assistant call for interacting with an electronic digital assistant;
  - identify one of (i) a primary talkgroup to which the mobile radio is affiliated out of a plurality of available talkgroups and (ii) an agency to which the mobile radio belongs out of a plurality of available agencies;
  - select or create a particular electronic digital assistant talkgroup having a unique talkgroup identifier, different from the primary talkgroup, through which the mobile radio may interact with the electronic digital assistant;
  - identify one or more, but less than all of a plurality of dispatch consoles, particular dispatch consoles that are one of (i) subscribed to monitor the primary talkgroup of the mobile radio out of the plurality of available talkgroups and (ii) a member of a same agency as the mobile radio out of the plurality of available agencies; and
  - responsive to receiving the request, cause the electronic digital assistant call to the particular electronic digital assistant talkgroup to be established including:
    - the electronic digital assistant;
    - the mobile radio; and
    - the one or more particular dispatch consoles to allow one or more associated dispatchers operating the respective one or more particular dispatch consoles to monitor the mobile radio's interactions with the electronic digital assistant during the electronic digital assistant call.

20. A non-transient computer readable medium containing program instructions for causing an electronic computing device to perform a set of functions, the set of functions including:
- receive, at the electronic computing device from a mobile radio, a request to establish an electronic digital assistant call for interacting with an electronic digital assistant;
- identify, by the electronic computing device, one of (i) a primary talkgroup to which the mobile radio is affiliated out of a plurality of available talkgroups and (ii) an agency to which the mobile radio belongs out of a plurality of available agencies;
- select or create, by the electronic computing device, a particular electronic digital assistant talkgroup having a unique talkgroup identifier, different from the primary talkgroup, through which the mobile radio may interact with the electronic digital assistant;
- identify, by the electronic computing device, one or more, but less than all of a plurality of dispatch consoles, particular dispatch consoles that are one of (i) subscribed to monitor the primary talkgroup of the mobile radio out of the plurality of available talkgroups and (ii) a member of a same agency as the mobile radio out of the plurality of available agencies; and
- responsive to receiving the request, cause, by the electronic computing device, the electronic digital assistant call to the particular electronic digital assistant talkgroup to be established including:
  - the electronic digital assistant;
  - the mobile radio; and
  - the one or more particular dispatch consoles to allow one or more associated dispatchers operating the respective one or more particular dispatch consoles to monitor the mobile radio's interactions with the electronic digital assistant during the electronic digital assistant call.

* * * * *